United States Patent Office 2,888,395
Patented May 26, 1959

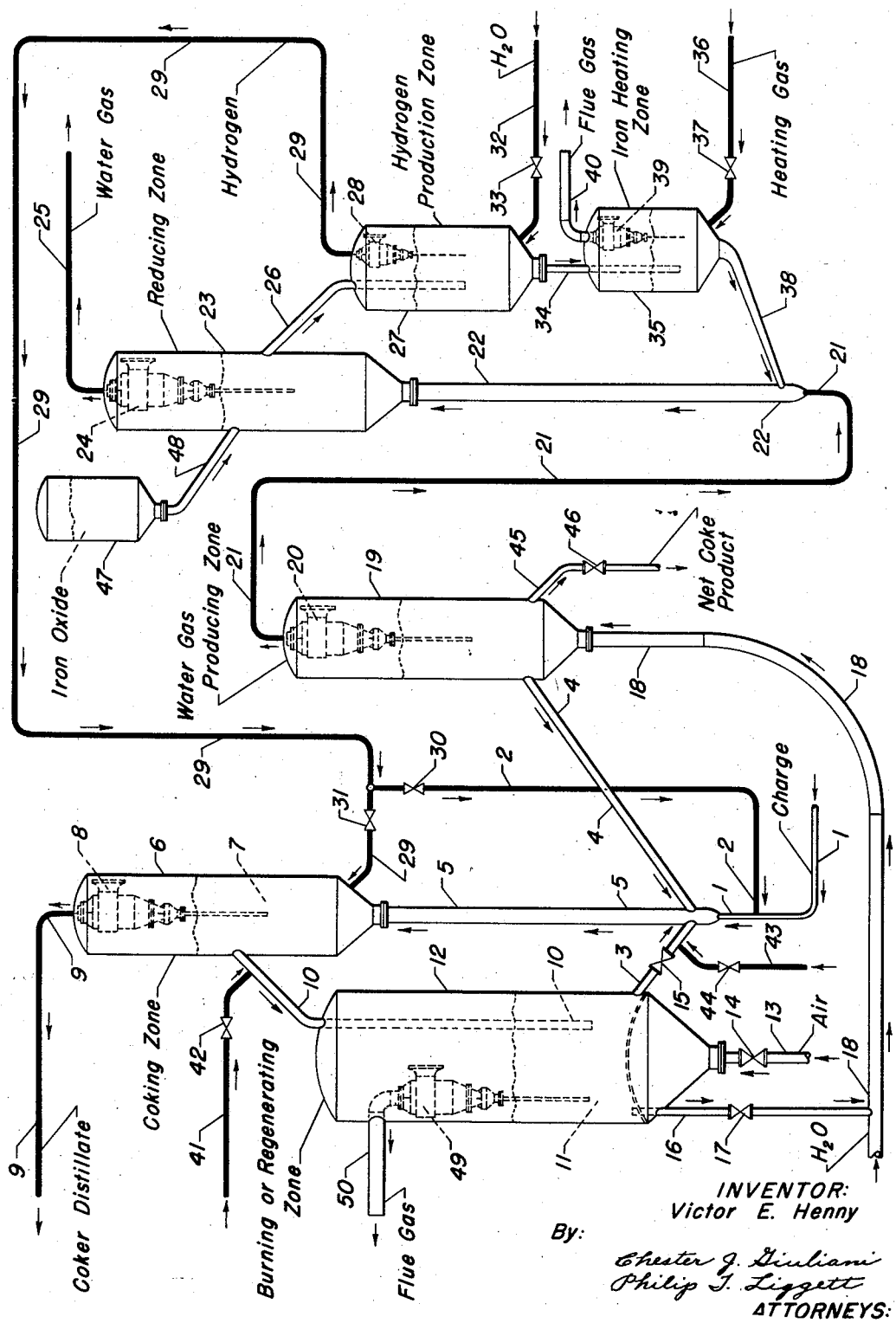

2,888,395

HYDROCARBON CONVERSION PROCESS IN THE PRESENCE OF HYDROGEN PRODUCED IN THE PROCESS

Victor E. Henny, La Grange, Ill., assignor, by mesne assignments, to Universal Oil Products Company, Des Plaines, Ill., a corporation of Delaware Application March 29, 1954, Serial No. 419,161

7 Claims. (Cl. 208—111)

This invention relates to a combination process including the steps of hydrocarbon conversion and hydrogen production which are advantageously inter-related to obtain a peculiarly beneficial result.

It is an object of this invention to convert a heavy hydrocarbon fraction completely into gases and light hydrocarbon distillates leaving no residual fraction to be disposed of.

It is another object of this invention to effect endothermic and exothermic reactions with such inter-relation therebetween that the heat produced in the exothermic reaction provides the required endothermic heat of reaction.

It is another object of this invention to control the process conditions by proportioning carbon removal between an exothermic oxidation reaction and an endothermic hydrogen producing reaction so that the temperatures of the various streams may be regulated regardless of the amount of carbon to be removed.

It is another object of this invention to remove carbon in a manner to produce reducing gas from water, which reducing gas is used as a reactant to produce substantially pure hydrogen for use in the coking zone thereby producing a more saturated product and adding hydrogen thereto.

In the main embodiment the present invention relates to a process for the conversion of a heavy hydrocarbon fraction which comprises contacting said hydrocarbon with hot particulate contact material at conversion conditions in the presence of hydrogen whereby said hydrocarbon is converted to lower boiling products and coke, withdrawing said lower boiling products from the conversion zone, passing the resultant coke covered contact material to a burning zone wherein it is contacted with oxygen to at least partially remove the coke therefrom, passing at least a portion of the resultant hot contact material into contact with said hydrocarbon, passing another portion of said hot contact material into contact with $H_2O$ in a water gas producing zone whereby hydrogen and carbon monoxide are produced, returning the solid particles from the water gas producing zone into contact with said hydrocarbon, passing said hydrogen and carbon monoxide into contact with hot particulate iron oxide in a reducing zone, passing the resultant iron into contact with $H_2O$ in a hydrogen producing zone, passing the resultant hydrogen into contact with said hydrocarbon as said hydrogen, passing the resultant iron oxide into a heating zone wherein it is contacted with hot gas and returning the resultant hot iron oxide to said reducing zone.

The present process is particularly directed towards the conversion of hydrocarbon fractions, however it may find use also in converting bituminous material, oil bearing sands, tar sands, shale and other organic material either in the solid or the liquid phase. The process is particularly suitable for the conversion of difficultly converted petroleum fractions such as reduced crude, heavy cycle oils, cracked residuum, total crude, or other residuum fractions. Those fractions are not readily converted by ordinary cracking methods because of the extremely high coke production which results from the cracking reactions which necessitates excessive burning for carbon removal which in turn raises the temperature of the catalytic material to a point where the activity is destroyed or at least seriously impaired. The residuum fractions are characterized by being hydrogen poor, that is having extremely large quantities of carbon in the molecule in relation to the amount of hydrogen present. The molecules contained in a residuum fraction are extremely large and in order to be reduced to a light petroleum distillate such as gasoline they must be severed several times thereby causing the resulting gasoline fraction to be highly unsaturated and therefore unstable in storage. Having a tendency to form gum when used as a motor fuel and having other undesirable characteristics. The present process provides a manner of making useful products from these undesirable residuum fractions without forming further residuum fractions.

The main reaction effected by the process of the present invention is a coking or cracking reaction which comprises the severance of carbon-carbon bonds to produce at least two smaller molecules from one large molecule. The products from the reaction are unsaturated as hereinbefore discussed and the heavier molecules tend to polymerize, becoming increasingly heavy and more carbonaceous until they become a solid black material which deposits on the contact material and is known as coke. When hydrogen is present in the reaction zone the unsaturated molecules formed by the cracking reaction are at least partially hydrogenated to form the corresponding saturated molecule which is not prone to polymerization. It may therefore be seen that the coke forming tendencies of the reaction may be retarded and a more saturated product may be obtained by having hydrogen present in the reaction zone. Even though the conditions in the reaction zone are not ideal for hydrogenation, the mere presence of large quantities of hydrogen, by the mass action principle, will cause substantial saturation of the olefinic material therein.

In order to promote the reaction and to prevent formation of coke on the chamber walls and other equipment it is desirable to provide solid particulate contact material in the reaction zone. It is also desirable to have this material present since it is extremely suitable as a heat transfer medium so that external sources of heat are not required. The solid particulate material in the reaction zone may be catalytic in nature or inert. The catalytic contact material may be any of the well known cracking catalysts such as silica-alumina, silica-magnesia, silica-zirconia, silica-alumina-magnesia, or other combinations of these which may be synthetically prepared or naturally occurring as in various clays, bleaching earths, etc. The non-catalytic materials which may be used include porcelain, bauxite, silica, which may be synthetically prepared or in the form of kieselguhr, inert solids from shale or tar sands etc. or a particularly preferred non-catalytic material is particulate carbon. The catalytic materials used may also contain small quantities of a hydrogenation promoting material which may be the metals of the left hand column of groups V, VI or VII or any of the metals of group VIII or any combinations of these or their compounds. The hydrogenation promoting material will usually be disposed on the surface of the cracking catalyst in small quantities, say from about 0.01% to about 10%, and will preferably be in an extended surface condition as when prepared by impregnating the solid cracking material with a solution containing the desired hydrogenation promoter as an anion which is subsequently reduced on the surface of the contact material as a metal or deposited there as an oxide or sulfide. The petroleum coke formed by the present invention is extremely useful as metallurgical coke and electrode coke and other uses where extremely pure carbon is required and when it is desired a net coke yield may be realized from the present process. When a net coke yield is desired it is particularly preferred to use carbon as the contact material so that the particulate product will be homogeneous throughout each particle. When carbon is the contact material the process will be provided with a means of classifying the particles so that the larger particles are withdrawn as net coke yield while the smaller particles are returned to the process as nuclei for further deposits.

The coking reactions hereinbefore described are effected preferably in an elevaed coking zone which is maintained at a temperature of from about 850° F. to about 1500° F. and at superatmospheric pressure in the presence of hydrogen. In the preferred embodiment a fluidized bed of hot particulate contact material is maintained in the coking zone. A fluidized bed is so well known in the art as to not require detailed description, however, it may be said that the fluidized bed consists of particles in a state of hindered settling caused by an ascending gas stream passing therethrough. The ascending gas stream in the present invention comprises the vaporized charge stock and, at least in one embodiment, a hydrogen-containing gas which carry therewith a suspension of particulate solid.

As hereinbefore described the particles in the coking or cracking zone become encrusted with coke. The removal of coke from the particles is effected by passing the coke covered particles to a burning or regeneration zone wherein they are contacted with oxygen or an oxygen-containing gas, preferably air, whereby the coke is oxidized to carbon oxides with a resultant rise in temperature of the particles. The burning zone will generally be operated at a temperature of from about 1200° F. to about 2500° F. or more and the burning is preferably effected in a fluidized bed. The oxidation effected in this zone is not sufficient to remove all of the coke from the catalyst but only the amount required by certain limitations to be hereinafter discussed.

A portion of the particles from the burning zone are returned to the stream of incoming charge stock as the hot particulate solid material and are thereafter passed into the coking zone to repeat the coking cycle. Another portion of the hot particles from the burning zone are contacted with a stream comprising $H_2O$ and passed to a water gas producing zone. The term $H_2O$ is used generically herein to include liquid water or steam and the stream comprising $H_2O$ may include other material, specifically air or oxygen. Depending upon the quantity of hot particles withdrawn from the burning zone for the water gas reaction and the temperature of those particles, the $H_2O$ commingled therewith will be in the form of water, steam, or superheated steam so that the proportion and temperature of the two streams will cause the proper conditions to be obtained in the water gas producing zone. When additional heat is required oxygen or air may be included in the $H_2O$ stream so that producer gas will be manufactured instead of water gas, the producer gas being very similar in composition except containing additional quantities of carbon oxides and of course, when air is used, corresponding quantities of nitrogen. The water gas producing zone must be maintained at a temperature which causes the water gas reaction to be effected within a reasonable time and at the same time provides for favorable equilibrium so that reasonable quantities of hydrogen may be produced. The most suitable temperatures are from about 1500° F. to about 1900° F. and preferably from about 1600° F. to about 1850° F. at atmospheric or slightly superatmospheric pressures. The water gas reaction produces hydrogen and carbon monoxide and at least some carbon dioxide and results in the removal of carbon from the particles.

The particles from the water gas producing zone are returned to contact with the incoming hydrocarbon charge and passed to the coking zone for further reaction.

The water gas reaction is endothermic and therefore the particles return to the reaction zone at a lower temperature than they were when entering the water gas producing zone. The commingling of the particles from the water gas producing zone and the burning zone with the charge stock produces a means of controlling the temperature of the reaction in the coking zone. Thus, the proportion and temperature of particles from the water gas producing zone and the burning zone may be varied as well as the temperature of the incoming charge stock to cause the proper temperature to exist in the coking zone. Therefore, when the coking zone is too hot the amount of carbon removed by oxidation may be reduced and the amount of carbon removed by the water gas reaction may be increased thereby reducing the proportion of particles entering the charge stream at a high temperature and increasing the proportion entering at a low temperature. It may readily be seen that this will cause the temperatue in the coking zone to be diminished without changing the temperature of the charge stock entering the plant. The overall effect of varying the amount of carbon removed is to vary the hydrogen production in the water gas producing zone and since this is not critical and over production is not harmful the means of control is extremely suitable.

The water gas produced, which contains hydrogen and carbon monoxide as hereinbefore described, is passed to a reducing zone wherein it contacts hot particles preferably of iron oxide. The hot iron oxide in a reducing atmosphere causes a reaction between iron oxide and hydrogen to produce pure iron and water and another reaction between iron oxide and carbon monoxide to produce pure iron and carbon dioxide and as a result of these reactions the fluidized bed of iron oxide maintained in the reducing zone is converted to pure iron. The water gas is withdrawn from the reducing zone and may be vented to the atmosphere or burned for what fuel value remains in it and the hot particles of pure iron are passed to a hydrogen producing zone wherein they are contacted with $H_2O$. The treatment of pure iron with $H_2O$ at elevated temperature causes the iron to oxidize with the resultant liberation of hydrogen from the water and the hydrogen thus produced is passed into the coking zone to provide a hydrogen atmosphere desired therein. The iron oxide which is discharged from the hydrogen producing zone may be passed into a heating zone when it is required to reheat it. In the heating zone the iron particles are contacted with hot gases such as the flue gas from the burning zone or with an oxidizable mixture of fuel gas and oxygen. When the water gas entering the reducing zone is sufficiently hot the use of an iron heating zone may be eliminated, however, it is contemplated in the process of this invention in the event that it is required. The hot iron particles from the iron heating zone are returned to the reducing zone for further treatment with water gas as hereinbefore described.

Although iron oxide is the preferred particulate material to be used in the hydrogen producing zone, other material may be used such as nickel, cobalt, or other metals capable of reducing water. The iron or other metal may be used as such or in an extended surface condition as when composited with a suitable porous, inert carrier such as silica, alumina, clay, kieselguhr, etc.

The accompanying drawing is submitted to further illustrate the process of this invention and will be described in relation to the conversion of a reduced crude fraction into lighter hydrocarbons and gases. It is of course intended that this description will be illustrative rather than limiting and that the drawing and description thereof relate only to one embodiment of the present invention.

Referring now to the drawing, reduced crude passing through line 1 is commingled with hydrogen from line 2 and the commingled stream is joined with hot catalyst particles from line 3 and line 4. The hot catalyst particles vaporize the reduced crude and the resulting suspension of hot contact particles, vaporized reduced crude and hydrogen passes through line 5 wherein the initial cracking-coking reactions are effected. The suspension passes into coking zone 6 wherein fluidized bed 7 of contact material is maintained at a temperature of from about 850° F. to about 1500° F. As a result of the contact between the reduced crude charge and the hot particles, a lower boiling hydrocarbon fraction known as coker distillate is produced and is withdrawn from the upper portion of coking zone 6 through separator 8 and line 9 and passed to fractionation. The particles of contact material in the fluidized bed 7 becomes coated with coke as a result of the reactions effected therein and pass through standpipe 10 to become a portion of fluidized bed 11 maintained in burning or regenerating zone 12. In burning zone 12 the particles are contacted as a fluidized bed with an oxygen-containing gas which enters burning zone 12 through line 13 and valve 14. The oxygen-containing gas maintains the particles in a fluidized state of hindered settling and at the same time effects a degree of carbon removal by converting the carbon to oxides thereof. The spent flue gas discharges from burning zone 12 through separator 49 and line 50 and the particles which have at least a portion of the coke removed therefrom and which are now in a hot condition, at a temperature of from about 1200° F. to about 2500° F. or more, descend to the lower portion of bed 11. A portion of the hot particles pass from the lower portion of burning zone 12 through line 3 and valve 15 and, as hereinbefore mentioned, are commingled with the incoming stream of reduced crude and hydrogen.

Another portion of the hot particles from the lower portion of burning zone 12 pass through line 16 and valve 17 and are commingled with a stream comprising $H_2O$ in line 18. The commingled stream of hot coke-containing particles and $H_2O$ pass through line 18 into the lower portion of water gas producing zone 19 wherein the water gas reactions are effected and result in a gas stream comprising carbon oxides and hydrogen and a particle stream at a lower temperature and containing less coke than the particle stream that entered zone 19. The contact material passes from the lower portion of water gas producing zone 19 through line 4 and, as hereinbefore described, also commingle with the stream of incoming charge.

The water gas produced in zone 19 passes through particle separator 20 and line 21 and is commingled in line 22 with a stream of hot particulate iron oxide. The suspension of iron oxide in water gas passes through line 22 and into the lower portion of reducing zone 23 wherein the iron oxide is reduced to iron with the resultant formation of carbon dioxide and water which passes from the upper portion of reducing zone 23 through separator 24 and line 25. Reducing zone 23 may be provided with hopper 47 and line 48 for adding fresh iron oxide to the system. Although this is a convenient point for iron oxide addition, it is of course obvious that the oxide may be added to the iron heating zone or pure iron may be added to the hydrogen producing zone.

The iron particles resulting from the reactions in reducing zone 23 pass through line 26 into hydrogen production zone 27 wherein they are contacted with a stream of $H_2O$ or steam entering through line 32 and valve 33 at an elevated temperature thereby producing iron oxide and hydrogen. The hydrogen resulting from this reaction is substantially pure except for unreacted $H_2O$ and is passed through separator 28 and line 29 through valve 30 into the before mentioned line 2 to commingle with the incoming reduced crude or alternatively through valve 31 into the lower portion of coking zone 6. The latter embodiment may be preferred when it is desired to reduce the volume of gas in line 5 which carries the reduced crude and hot particles to the coking zone.

The iron oxide particles resulting from the reduction of water in hydrogen producing zone 27 pass through line 34 into iron heating zone 35 wherein they are contacted with a stream of heating gas entering zone 35 through line 36 and valve 37. The heated iron particles pass from the lower portion of zone 35 through line 38 and commingle with the before mentioned stream of water gas passing through conduit 22. The heating gas discharges from zone 35 through separator 39 and line 40 and vents to the atmosphere.

Many modifications of the embodiment shown in this drawing may be made by those skilled in the art without removing the modified process from the broad scope of this invention. These modifications may consist of various arrangements of valves, pumps, instruments etc. in order to provide desirable controls at various points in the flow. Some of these modifications might include the use of stripping gas to remove occluded undesirable material from a stream of particles transferring between zones. For example, line 41 and valve 42 may be provided in line 10 between coking zone 6 and burning zone 12 to remove vaporizable hydrocarbons from the surface of the contact material thereby recovering them as product instead of causing their oxidation in the burning zone. Similarly, line 43 and valve 44 may be used to provide stripping gas to material descending from burning zone 12 to line 5 through conduit 3. Stripping may be desired in other standpipes in the flow in order also to form a seal between zones when desired.

When it is desired to realize a net coke yield from the present operation line 45 and valve 46 may be provided to the water gas producing zone for the withdrawal of solid particles. It is preferred that the solid particles be withdrawn from the water gas producing zone since at this point they will be in the form of hard, dry coke at a relatively low temperature, however, a net coke make may be withdrawn from burning zone 12 when desired.

It may be seen from the foregoing specification that the process of this invention provides a means of processing a heretofore difficultly refined material to produce useful products and to dispose of waste materials as gases. The process is a significant improvement over similar processes wherein water gas is utilized in the coking zone as the source of hydrogen since the additional and interrelated process of forming hydrogen from water through the use of iron provides a stream of substantially pure hydrogen to the coking zone thereby requiring less total pressure in order to increase the hydrogen partial pressure with its resultant benefits in greater saturation of olefins. In addition, however, to supplying pure hydrogen to the coking zone there is the advantage of requiring no separation of carbon oxides, nitrogen and other undesirable material. The boiling point of the useful hydrocarbons and the hydrogen gas is sufficiently different so that a separation may be readily made without elaborate equipment and the hydrogen will not cause undesirable side reactions to occur.

I claim as my invention:

1. A process for the conversion of a heavy hydrocarbon fraction which comprises contacting said hydrocarbon fraction with hot particulate contact material at conversion conditions in the presence of hydrogen obtained as hereinafter set forth, whereby said hydrocarbon fraction is converted to lower boiling products and coke, withdrawing said lower boiling products from the conversion zone, passing the resultant contact material with a coke deposition to a burning zone wherein it is contacted with oxygen to at least partially remove the coke therefrom, passing at least a portion of the resultant hot contact material into contact with said hydrocarbon fraction, passing another portion of said hot contact material into contact with $H_2O$ in a water gas producing zone whereby hydrogen and carbon monoxide are produced, returning the solid particles from the water gas producing zone into contact with said hydrocarbon, passing said hydrogen and carbon monoxide into contact with hot particulate iron oxide in a reducing zone, passing the resultant iron from last said zone into contact with $H_2O$ in a hydrogen producing zone, passing the resultant hydrogen into contact with said hydrocarbon fraction as aforesaid hydrogen, passing the resultant iron oxide into a heating zone wherein it is contacted with a hot gaseous stream and returning the resultant hot iron oxide to said reducing zone.

2. The process of claim 1 further characterized in that said particulate contact material is catalytic.

3. The process of claim 1 further characterized in that said particulate contact material comprises silica-alumina.

4. The process of claim 1 further characterized in that said particulate contact material comprises silica-alumina composited with a hydrogenation promoter selected from the group consisting of metals from the left hand columns of groups V, VI and VII, group VIII, compounds of these and mixtures thereof.

5. The process of claim 1 further characterized in that said particulate contact material is non-catalytic.

6. The process of claim 1 further characterized in that said particulate contact material comprises carbon.

7. A process for the conversion of a heavy hydrocarbon fraction which comprises contacting said hydrocarbon fraction with a composite comprising silica-alumina at a temperature of from about 850° F. to about 1500° F. in the presence of hydrogen obtained as hereinafter set forth, whereby said hydrocarbon fraction is converted to lower boiling products and coke, withdrawing said lower boiling products from the conversion zone, passing the resultant silica-alumina with a coke deposition to a burning zone wherein it is contacted with oxygen at a temperature of from about 1200° F. to about 2500° F. to at least partially remove the coke therefrom, passing at least a portion of the resultant hot silica-alumina into contact with said hydrocarbon fraction, passing another portion of said hot silica-alumina into contact with $H_2O$ in a water gas producing zone maintained at a temperature of from about 1500° F. to about 1850° F. whereby hydrogen and carbon monoxide are produced, returning the silica-alumina particles from the water gas producing zone into contact with said hydrocarbon, passing said hydrogen and carbon monoxide into contact with hot particulate iron oxide in a reducing zone, passing the resultant iron from last said zone into contact with $H_2O$ in a hydrogen producing zone, passing the resultant hydrogen into contact with said hydrocarbon fraction as aforesaid hydrogen, passing the resultant iron oxide into a heating zone wherein it is contacted with a hot gaseous stream returning the resultant iron oxide to said reducing zone.

References Cited in the file of this patent

UNITED STATES PATENTS

| | | |
|---|---|---|
| 2,362,270 | Hemminger | Nov. 7, 1944 |
| 2,377,116 | Voorhies et al. | May 29, 1945 |
| 2,600,430 | Riblett | June 17, 1952 |
| 2,614,067 | Reed et al. | Oct. 14, 1952 |
| 2,694,035 | Smith et al. | Nov. 9, 1954 |
| 2,738,307 | Beckberger | Mar. 13, 1956 |